United States Patent Office 3,336,410
Patented Aug. 15, 1967

3,336,410
ALKYLATION PROCESS AND CATALYST
THEREFOR
Herman S. Bloch, Skokie, Ill., and William G. Nixon, St. Petersburg, Fla., assignors to Universal Oil Products Company, Des Plaines, Ill., a corporation of Delaware
No Drawing. Filed Nov. 13, 1964, Ser. No. 411,683
18 Claims. (Cl. 260—671)

This invention relates to a process for the conversion of organic aromatic compounds and more particularly relates to a process for converting alkylatable aromatic compounds into more useful compounds. More specifically, this invention is concerned with a process for the alkylation of an alkylatable aromatic compound with an olefin-acting compound utilizing a novel catalytic composition of matter.

An object of this invention is to produce alkylated aromatic hydrocarbons, and more particularly, to produce monoalkylated benzene hydrocarbons. A specific object of this invention is a process for the production of ethylbenzene, a desired chemical intermediate, which ethylbenzene is utilized in large quantities in dehydrogenation processes for the manufacture of styrene, one of the starting materials for the production of resins and some synthetic rubber. Another specific object of this invention is to produce alkylated aromatic hydrocarbons boiling within the gasoline boiling range having high anti-knock value, which may be used as such or as a component of gasoline suitable for use in automobile and airplane engines. A further specific object of this invention is a process for the production of cumene by the reaction of benzene with propylene in the presence of a novel catalytic composition of matter, which cumene product is oxidized in large quantities to form cumene hydroperoxide which is readily decomposed into phenol and acetone. Another object of this invention is to provide a process for the introduction of alkyl groups into aromatic hydrocarbons of high vapor pressure at normal conditions with minimum loss of said high vapor pressure aromatic hydrocarbons and maximum utilization thereof in the process utilizing a novel catalytic composition of matter.

One embodiment of this invention resides in a process for the alkylation of an alkylatable aromatic compound with an olefin-acting compound at alkylation conditions in the presence of a substantially anhydrous catalyst prepared by combining a refractory inorganic oxide with a halosulfonic acid to effect chemical combination of said refractory inorganic oxide with said halosulfonic acid.

A further embodiment of this invention resides in a process for the alkylation of an alkylatable aromatic compound with an olefin-acting compound at alkylation conditions including a temperature in the range of from about 0° to about 300° C. and a pressure in the range of from about atmospheric to about 200 atmospheres in the presence of a substantially anhydrous catalyst prepared by combining a refractory inorganic oxide with a halosulfonic acid to effect chemical combination of said refractory inorganic oxide with said halosulfonic acid.

A specific embodiment of this invention resides in a process for the alkylation of benzene with ethylene at alkylation conditions including a temperature in the range of from about 0° to about 300° C. and a pressure in the range of from about atmospheric to about 200 atmospheres in the presence of a substantially anhydrous catalyst prepared by combining gamma-alumina with chlorosulfonic acid to effect chemical combination of said gamma-alumina with said chlorosulfonic acid.

A further specific embodiment of this invention resides in a process for the alkylation of benzene with a refinery off-gas at alkylation conditions including a temperature in the range of from about 0° to about 300° C. and a pressure in the range of from about atmospheric to about 200 atmospheres in the presence of a substantially anhydrous catalyst prepared by combining gamma-alumina with chlorosulfonic acid to effect chemical combination of said gamma-alumina with said chlorosulfonic acid.

Other objects and embodiments referring to alternative unsaturated organic compounds and to alternative catalytic compositions of matter will be found in the following further detailed description of the invention.

It has now been discovered that aromatic compounds and particularly alkylatable aromatic compounds may be converted to other and more useful compounds by contacting said alkylated aromatic compound with an olefin-acting compound in the presence of certain catalytic compositions of matter which are prepared by specific methods. Examples of alkylatable aromatic compounds which may be converted according to the process of this invention include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, diethylbenzenes, triethylbenzenes, normal propylbenzene, isopropylbenzene, etc. Preferred alkylatable aromatic compounds are monocyclic aromatic hydrocarbons, that is benzene hydrocarbons. Higher molecular weight alkylaromatic hydrocarbons are also suitable, these include those aromatic hydrocarbons such as are produced by the alkylation of aromatic hydrocarbons with olefin polymers and are used as intermediates in the preparation of sulfonate surface-active agents. Such products are frequently referred to in the art as detergent alkylate, and include hexylbenzenes, nonylbenzenes, dodecylbenzenes, pentadecylbenzenes, hexyltoluenes, nonyltoluenes, dodecyltoluenes, pentadecyltoluenes, etc. Very often alkylate is obtained as a high boiling fraction in which the alkyl group attached to the aromatic nucleus varies in size from about $C_9$ to $C_{18}$. Other suitable aromatic hydrocarbons, which at specified conditions, depending upon melting point of the aromatic chosen, would be in liquid form, would include those aromatic hydrocarbons with 2 or more aryl groups such as diphenyl, diphenylmethane, triphenyl, triphenylmethane, fluorene, stilbene, etc. Examples of other aromatic hydrocarbons utilizable within the scope of this invention which at specified alkylation conditions, depending upon melting point of the aromatic chosen, would be in liquid form, include those containing condensed aromatic rings. These include naphthalene, alkyl naphthalenes, anthracene, phenanthrene, naphthacene, rubrene, etc. Of the above-mentioned aromatic hydrocarbons that could be utilized in the process of this invention, the benzene hydracorbons are preferred, and of the preferred benzene hydrocarbons, benzene itself is particularly preferred.

The olefin-acting compound, acting as the alkylating agent, may be selected from diverse materials including monoolefins, diolefins, polyolefins, acetylenic hydrocarbons, and also alcohols, ethers, and esters, the latter including alkyl halides, alkyl sulfates, alkyl phosphates, and various esters of carboxylic acids. The preferred olefin-acting compounds are olefinic hydrocarbons which comprise monoolefins containing one double bond per molecule and polyolefins which contain more than one double bond per molecule. Monoolefins which are utilized as olefin-acting compounds in the process of the present invention are either normally gaseous or normally liquid and include ethylene, propylene, 1-butene, 2-butene, isobutylene, and higher molecular weight normally liquid olefins such as the various pentenes, hexenes, heptenes, octenes, and mixtures thereof, and still higher molecular weight liquid olefins the latter including various olefin polymers having from about 9 to about 18 carbon atoms per molecule including propylene trimer, propylene tetramer, propylene pentamer, etc. Cycloolefins such as cyclopentene, methylcyclopentene, cyclohexene, methylcyclohexene, etc., may also be utilized. Also included within the scope of the olefin-acting compound are certain substances capable of producing olefinic hydrocarbons or intermediates thereof under the conditions of operation utilized in the process. Typical olefin-producing substances or olefin-acting compounds capable of use include alkyl halides capable of undergoing dehydrohalogenation to form olefinic hydrocarbons and thus containing at least 2 carbon atoms per molecule. Examples of such alkyl halides include ethyl fluoride, n-propyl fluoride, tert-butyl fluoride, etc., ethyl chloride, n-propyl chloride, isopropyl chloride, n-butyl chloride, isobutyl chloride, sec-butyl chloride, tert-butyl chloride, etc., ethyl bromide, n-propyl bromide, isopropyl bromide, n-butyl bromide, isobutyl bromide, sec-butyl bromide, tert-butyl bromide, etc. As stated hereinabove, other esters such as alkyl sulfates including ethyl sulfate, propyl sulfate, etc., and alkyl phosphates including ethyl phosphates, etc., may also be utilized. Ethers such as diethyl ether, ethyl propyl ether, dipropyl ether, etc., are also included within the generally broad scope of the term olefin-acting compound and may be successfully utilized as alkylating agents in the process of this invention.

In addition, the process of this invention may be successfully applied to and utilized for complete conversion of olefin hydrocarbons when these olefin hydrocarbons are present in minor quantities in various gas streams. Thus, the normally gaseous olefin hydrocarbons for use in the process of this invention need not be concentrated. Such normally gaseous olefin hydrocarbons appear in minor quantities in various refinery gas streams, usually diluted with gases such as hydrogen, nitrogen, methane, ethane, propane, etc. These gas streams containing minor quantities of olefin hydrocarbons are obtained in petroleum refineries from various refinery installations including thermal cracking units, catalytic cracking units, thermal reforming units, coking units, polymerization units, dehydrogenation units, etc. Such refinery gas streams have in the past often been burned for fuel value, since an economical process for the utilization of the olefin hydrocarbon content has not been available. This is particularly true for refinery gas streams known as off-gas streams containing relatively minor quantities of olefin hydrocarbons such as ethylene, propylene, etc.

As hereinbefore set forth, this invention is concerned with a process for the alkylation of alkylatable aromatic compounds, said process being effected in the presence of a catalyst which possesses a high degree of hydrocarbon conversion activity and is particularly effective as an alkylation catalyst for alkylatable aromatic compounds, a representative number of which are hereinabove set forth. The catalyst comprises a refractory inorganic oxide that is combined with a halosulfonic acid to effect chemical combination of the refractory inorganic oxide with said halosulfonic acid. Satisfactory refractory oxides for the preparation of catalysts for use in the process of this invention include high surface area crystalline alumina modifications such as gamma-, eta- and theta-alumina, although these are not necessarily of equivalent suitability. By the term high surface area is meant a surface area measured by surface adsorption techniques within the range of from about 25 to about 500 or more square meters per gram and preferably a surface area of approximately 100 to 300 square meters per gram. In addition to the aforementioned gamma-, eta- and theta-aluminas which may be utilized as solid supports, it is also contemplated that other refractory oxides such as zirconia, magnesia, thoria, etc., and combinations of refractory oxides such as silica-alumina, silica-magnesia, alumina-silica-magnesia, alumin-thoria, alumin-zirconia, etc., may also be utilized as solid supports for the catalyst of the present invention.

As set forth hereinabove, the catalyst comprises a refractory inorganic oxide that is combined with a halosulfonic acid to effect chemical combination of the refractory inorganic oxide with said halosulfonic acid. Particularly preferred halosulfonic acids include chlorosulfonic acid and fluosulfonic acid due mainly to the cheapness and to the readiness with which they may be procured although the invention is not restricted to their use, but may employ any of the halosulfonic acids insofar as they are adaptable. However, it is not intended to infer that different halosulfonic acids which may be employed will produce catalysts which have identical effects upon any given organic reaction as each of the catalysts produced from different acids and by slightly varying procedures will exert its own characteristic action.

It is a feature of the present invention that the finished catalyst of the present invention prepared as hereinafter set forth has increased structural strength and a high degree of stability due to the immobility of the components of the finished catalyst inasmuch as chemical combination of the refractory inorganic oxide with the halosulfonic acid is accomplished as hereinafter described.

The catalyst of the present invention comprises a halosulfonic acid chemically combined with the refractory inorganic oxide so as to effect chemical combination of the hydroxyl groups of the refractory inorganic oxide with the halosulfonic acid, and as hereinbefore set forth, it is the particular association of these components which results in the unusual catalytic properties of this catalyst. The halosulfonic acid may be chemically combined with the refractory inorganic oxide at temperatures in the range of between 100° C. and 600° C. In this manner, the halosulfonic acid is vaporized as it passes over the refractory inorganic oxide and chemical combination occurs. It is also contemplated within the scope of this invention that carrier gases such as nitrogen and the like may be employed. In the course of the chemical combination, hydrogen halide is liberated, and it is believed that the reactions which take place are as follows:

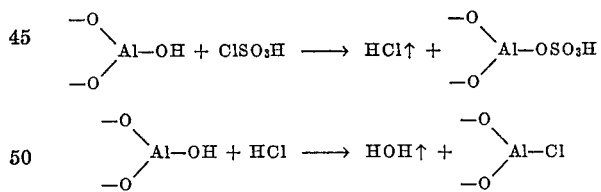

In another manner of preparation, when it is suspected that the refractory inorganic oxide contains, for example, more combined water than is desired, halogen may be chemically substituted for hydroxy groups in the refractory inorganic oxide with the elimination of water. For such reaction, the halogen must be added in a form which will readily chemically react with the refractory inorganic oxide in order to obtain the desired result. Therefore, it generally is preferable to utilize a halogen compound derived from the group consisting of hydrogen halides, such as hydrogen fluoride (which may actually increase the hydroxy-group content), hydrogen chloride, hydrogen bromide and/or hydrogen iodide and ammonium halides such as ammonium fluoride, ammonium chloride, ammonium bromide and/or ammonium iodide although these do not all have equivalent action and the particular halogen utilized will preferably correspond to the halosulfonic acid that will be subsequently utilized. Thus, in a preferred manner of preparing the catalyst of the present invention, hydrogen chloride will be utilized when chlorosulfonic acid is utilized. In any case, following the chemical combination of the halosulfonic acid with the refractory inorganic oxide, the catalytic composite is heat treated.

Heat treating this catalytic composite after chemical reaction with the halosulfonic acid will drive off any excess volatile material from the catalyst, thereby allowing the halosulfonic acid reaction product to remain impregnated on and chemically bonded to the refractory inorganic oxide.

In contradistinction to prior art hydrocarbon conversion catalysts where the chemical addition of one compound to the refractory inorganic oxide usually enhances the surface area characteristics of the refractory inorganic oxide, the chemical addition of the halosulfonic acid to the refractory inorganic oxide does not enhance the surface area characteristics of the refractory inorganic oxide inasmuch as we have found that our finished catalytic composite exhibits a significantly lower surface area than the refractory inorganic oxide originally possessed. Despite this fact, the finished catalytic composite still exhibits a higher hydrocarbon conversion activity with this lower surface area than would be expected and it is theorized that it is the particular chemical combination of the halosulfonic acid with the refractory inorganic oxide that creates this highly active catalyst even though the high surface area of the refractory inorganic oxide is reduced about 20 to 25% by this particular chemical combination.

The final catalytic composite obtained by the preparation as described hereinabove is substantially anhydrous due to the chemical combination of the halogen and/or halosulfonic acid with the refractory inorganic oxide. Thus, it is another feature of the present invention that a substantially anhydrous support initially is not necessary to prepare the catalyst of the present invention. Still another feature of the present invention is that due to the substantially anhydrous character of the final catalytic composite, deterioration of a physical nature by processing factors tending to further dry the catalyst is not a problem in the present invention.

As hereinbefore set forth, certain forms of alumina may be utilized as supports for the catalyst of this invention. For example, alumina may be prepared by any of the well-known suitable means of manufacture, one example of which is the addition of an alkaline reagent to a salt of aluminum in an amount sufficient to form aluminum hydroxide, which upon drying and calcining, is converted to alumina. Similarly, if the solid support comprises both alumina and silica, these components may be prepared by separate, successive or coprecipitation means.

For example, a refractory inorganic oxide previously prepared by the methods hereinabove set forth is then chemically combined with a halogen as by treating the refractory inorganic oxide with hydrogen chloride, said hydrogen chloride being added in an amount sufficient to drive off the excess water content of the refractory inorganic oxide. Following this, the refractory inorganic oxide is then chemically combined with the halosulfonic acid in an amount sufficient to allow the finished catalytic composite to contain from about 0.01 weight percent to about 3 weight percent of halogen and from about 1.0 to about 15.0% by weight of sulfur. Following this, the chemically combined material is then heat treated, preferably in a stream of dry inert gas such as nitrogen, in a furnace tube or muffle furnace or the like. The finished catalytic composite comprising the halosulfonic acid chemically combined with the refractory inorganic oxide is then utilized as the conversion catalyst.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the alkylatable aromatic compound and the olefin-acting compound are continuously charged to a reaction zone containing a fixed bed of the desired catalyst, said zone being maintained at the proper operating conditions of temperature and pressure including a temperature in the range of from about 0° to about 300° C. and preferably in the range of from about 40° C. to about 200° C., and a pressure in the range of from about atmospheric to about 200 atmospheres and at a liquid hourly space velocity (the volume of charge per volume of catalyst per hour) in the range of from about 0.1 to about 20 or more, and preferably in the range of from about 0.1 to about 10, or at a gaseous hourly space velocity in the range of from about 100 to about 1500 or more. The reaction zone may comprise an unpacked vessel or coil or may be lined with an adsorbent packing material. The two reactants may be charged through separate lines or, if so desired, may be admixed prior to entry into said reaction zone and charged thereto in a single stream. This charge passes through the catalyst bed in either an upward or downward flow and the alkylation product is continuously withdrawn, separated from the reactor effluent, and recovered, while any unreacted starting materials may be recycled to form a portion of the feed stock. Another continuous type operation comprises the moving bed type in which the reactants and the catalyst bed move either concurrently or countercurrently to each other while passing through said reaction zone. Yet another continuous type of operation which may be used is the slurry type in which the catalyst is carried into the reaction zone as a slurry in one or the other of the reactants.

Still another type of operation which may be used is the batch type operation in which a quantity of the alkylatable aromatic compound, the olefin-acting compound and the catalyst are placed in an appropriate apparatus such as, for example, a rotating or stirred autoclave or an alkylation flask. The apparatus is then heated to the desired temperature and maintained thereat for a predetermined residence time at the end of which time the vessel and contents thereof are cooled to room temperature and the desired reaction product recovered by conventional means such as, for example, by washing, drying, fractional distillation, crystallization, etc.

The following examples are introduced for the purpose of illustration only with no intention of unduly limiting the generally broad scope of the present invention.

*Example 1*

In this example, 300 cc. of gamma-alumina spheres having a surface area of 180 square meters per gram were treated in a furnace tube with a gaseous mixture of hydrogen chloride and nitrogen for 2 hours at 538° C. Gaseous hydrogen chloride and water appeared at the exit of the furnace tube. The substantially anhydrous refractory inorganic oxide was then maintained at 538° C. and a chlorosulfonic acid-nitrogen mixture was passed over the catalyst so as to vaporize the chlorosulfonic acid over the alumina spheres. Appearance of a fuming gas in the exit of the furnace tube indicated when the chemical combination of the alumina with the chlorosulfonic acid was complete.

The catalyst was then cooled to room temperature in a nitrogen stream. The catalyst was analyzed for chloride and sulfur content and it was found that the catalyst contained 0.44 weight percent chloride and about 7.6 weight percent sulfur.

A portion (150 cc.) of the catalyst was then heat treated for 3 hours in a furnace tube at 538° C. in a stream of nitrogen to remove any excess volatile material from the catalyst. The heat treated catalyst was thereafter cooled and analyzed for chloride and sulfur content once again. It was found that the heat treated catalyst now contained 0.09 weight percent chloride and 7.13 weight percent sulfur clearly indicating that chemical combination of the chlorosulfonic acid with the alumina had occurred. The surface area of the finished heat treated catalytic composite was subsequently found to be 137 square meters per gram which is a reduction in surface area of about 24%. The pore volume of this catalytic composite was found to be 0.30 milliliter per gram and the pore diameter was found to be 88 A. This catalyst was designated as catalyst "A."

*Example II*

Another catalyst is prepared by chemically combining chlorosulfonic acid with a high surface area (about 200 square meters per gram) substantially anhydrous silica-alumina of 25% alumina content at a temperature of about 538° C. for 2 hours. The catalytic composite is then heat treated in a dry nitrogen stream at a temperature of about 550° C. A surface area determination of the catalytic composite indicates that the surface area of the finished catalytic composite is 20 to 25% less than that of the silica-alumina initially used. This catalyst is designated as catalyst "B."

*Example III*

Still another catalyst is prepared by combining fluosulfonic acid with gamma-alumina at a temperature of about 500° C. for a period of about 2 hours. The catalytic composite is then heat treated in a stream of dry nitrogen for 3 hours at a temperature in the range of 500–600° C. A surface area determination of the finished catalytic composite indicates that the surface area of the catalyst is less than that of the original refractory inorganic oxide. This catalyst is designated as catalyst "C."

*Example IV*

The catalyst prepared according to Example I above and designated as catalyst "A" is utilized in an alkylation reaction to determine the alkylation activity of said catalyst. In this experiment, 75 cc. of the catalyst prepared according to the method of Example I is placed in an appropriate apparatus which is provided with heating means. In the experiment, benzene and ethylene in 10:1 molar ratio are charged separately to the alkylation reaction zone. The reactor is maintained at about 500 p.s.i.g. and 150° C. Substantially complete conversion of the ethylene is obtained. The product is analyzed for olefins using a mass spectrometer and it is found that the product comprises ethylbenzene, diethylbenzene, polyethylbenzenes and unreacted benzene.

*Example V*

The catalyst prepared according to Example II and designated as catalyst "B" is utilized in the alkylation reaction zone, 100 cc. of the finished catalyst being placed in the alkylation apparatus. In the experiment, benzene and ethylene are charged separately to the alkylation zone which is maintained at about 500 p.s.i.g. and 125° C. Based on weight, substantially complete conversion of the ethylene is obtained. The product is again analyzed for olefins using a mass spectrometer and it is found that the product comprises ethylbenzene, diethylbenzene, polyethylbenzenes and unreacted benzene.

*Example VI*

The catalyst prepared according to Example III and designated as catalyst "C" is utilized in an alkylation reaction, 100 cc. of the finished catalyst being placed in the alkylation apparatus. In the experiment, benzene and propylene are charged separately to the alkylation zone. The reactor is maintained at about 400 p.s.i.g. and 125° C. Substantially complete conversion of the propylene is obtained. The product is analyzed for olefins using a mass spectrometer and it is found that the product comprises cumene, diisopropylbenzene, polypropylbenzenes and unreacted benzene.

*Example VII*

The catalyst prepared according to Example I above and designated as catalyst "A" is again utilized in the alkylation of benzene with a synthetic refinery off-gas similar to that normally observed from a catalytic cracking unit. A fresh 75 cc. batch of the catalyst is placed in an alkylation reactor and the reactor is maintained at a temperature in the range of from about 110° C. to about 215° C. at a pressure of about 600 p.s.i.g. The composition of the synthetic off-gas feed is as follows: carbon dioxide, 0.1 mol percent; nitrogen, 29.0 mol percent; carbon monoxide, 1.3 mol percent; hydrogen, 18.9 mol percent; methane, 35.0 mol percent; ethylene, 12.0 mol percent; ethane, 0.5 mol percent; propylene, 2.5 mol percent; propane, 0.1 mol percent; isobutane, 0.1 mole percent; and acetylene, 0.5 mol percent. The off-gas and benzene are charged separately to the alkylation zone. The plant liquid effluent is tested for unsaturation and is found to have a low bromine index indicating the substantial absence of olefin polymerization products. The product comprises ethylbenzene, diethylbenzene, polyethylbenzenes, cumene, diisopropylbenzene, polypropylbenzenes and 1,1-diphenylethane.

*Example VIII*

A dodecylene fraction comprising propylene tetramer is mixed with ten moles of benzene and the mixture is passed over a second 100 cc. batch of catalyst "A" prepared according to the method of Example I. The alkylation reactor is maintained at 145° C., 500 p.s.i.g., and a liquid hourly space velocity of 1. The resulting product is substantially olefin-free, and is found to be a mixture of mainly benzene and dodecylbenzenes.

We claim as our invention:

1. A process for the alkylation of an alkylatable aromatic compound with an olefin-acting compound at alkylation conditions in the presence of a substantially anhydrous halogen-containing catalyst prepared by combining a refractory inorganic oxide with a halosulfonic acid to effect chemical combination of said refractory inorganic oxide with said halosulfonic acid.

2. A process for the alkylation of an alkylatable aromatic compound with an olefin-acting compound at alkylation conditions including a temperature in the range of from about 0° to about 300° C. and a pressure in the range of from about atmospheric to about 200 atmospheres in the presence of a substantially anhydrous halogen-containing catalyst prepared by combining a refractory inorganic oxide with a halosulfonic acid to effect chemical combination of said refractory inorganic oxide with said halosulfonic acid.

3. A process for the alkylation of an alkylatable aromatic compound with an olefin-acting compound at alkylation conditions including a temperature in the range of from about 0° to about 300° C. and a pressure in the range of from about atmospheric to about 200 atmospheres in the presence of a substantially anhydrous chlorine-containing catalyst prepared by combining a refractory inorganic oxide with chlorosulfonic acid to effect chemical combination of said refractory inorganic oxide with said chlorosulfonic acid.

4. A process for the alkylation of an alkylatable aromatic compound with an olefin-acting compound at alkylation conditions including a temperature in the range of from about 0° to about 300° C. and a pressure in the range of from about atmospheric to about 200 atmospheres in the presence of a substantially anhydrous fluorine-containing catalyst prepared by combining a refractory inorganic oxide with fluosulfonic acid to effect chemical combination of said refractory inorganic oxide with said fluosulfonic acid.

5. The process of claim 2 further characterized in that said alkylatable aromatic compound is an alkylatable aromatic hydrocarbon.

6. The process of claim 2 further characterized in that said alkylatable aromatic compound is a benzene hydrocarbon.

7. The process of claim 2 further characterized in that said alkylatable aromatic compound is benzene.

8. The process of claim 2 further characterized in that said olefin-acting compound is an olefinic hydrocarbon.

9. The process of claim 2 further characterized in that said olefin-acting compound is a normally gaseous olefin.

10. The process of claim 2 further characterized in that said olefin-acting compound is a normally liquid olefin.

11. A process for the alkylation of benzene with ethylene at alkylation conditions including a temperature in the range of from about 0° C. to about 300° C. and a pressure in the range from about atmospheric to about 200 atmospheres in the presence of a substantially anhydrous halogen-containing catalyst prepared by combining a refractory inorganic oxide with a halosulfonic acid to effect chemical combination of said refractory inorganic oxide with said halosulfonic acid.

12. A process for the alkylation of benzene with propylene at alkylation conditions including a temperature in the range of from about 0° to about 300° C. and a pressure in the range of from about atmospheric to about 200 atmospheres in the presence of a susbtantially anhydrous halogen-containing catalyst prepared by combining a refractory inorganic oxide with a halosulfonic acid to effect chemical combination of said refractory inorganic oxide with said halosulfonic acid.

13. A process for the alkylation of benzene with butylene at alkylation conditions including a temperature in the range of from about 0° to about 300° C. and a pressure in the range of from about atmospheric to about 200 atmospheres in the presence of a substantially anhydrous halogen-containing catalyst prepared by combining a refractory inorganic oxide with a halosulfonic acid to effect chemical combination of said refractory inorganic oxide with said halosulfonic acid.

14 A process for the alkylation of benzene with a refinery off-gas at alkylation conditions including a temperature in the range of from about 0° to about 300° C. and a pressure in the range of from about atmospheric to about 200 atmospheres in the presence of a substantially anhydrous halogen-containing catalyst prepared by combining a refractory inorganic oxide with a halosulfonic acid to effect chemical combination of said refractory inorganic oxide with said halosulfonic acid.

15. A process for the alkylation of benzene with ethylene at alkylation conditions including a temperature in the range of from about 0° to about 300° C. and a pressure in the range of from about atmospheric to about 200 atmospheres in the presence of a substantially anhydrous chlorine-containing catalyst prepared by combining gamma-alumina with chlorosulfonic acid to effect chemical combination of said gamma-alumina with said chlorosulfonic acid.

16. A process for the alkylation of benzene with ethylene at alkylation conditions including a temperature in the range of from about 0° to about 300° C. and a pressure in the range of from about atmospheric to about 200 atmospheres in the presence of a substantially anhydrous chlorine-containing catalyst prepared by combining silica-alumina with chlorosulfonic acid to effect chemical combination of said silica-alumina with said chlorosulfonic acid.

17. A process for the alkylation of benzene with propylene at alkylation conditions including a temperature in the range of from about 0° to about 300° C. and a pressure in the range of from about atmospheric to about 200 atmospheres in the presence of a substantially anhydrous fluorine-containing catalyst prepared by combining gamma-alumina with fluosulfonic acid to effect chemical combination of said gamma-alumina with said fluosulfonic acid.

18. A process for the alkylation of benzene with a refinery off-gas at alkylation conditions including a temperature in the range of from about 0° to about 300° C. and a pressure in the range of from about atmospheric to about 200 atmospheres in the presence of a substantially anhydrous chlorine-containing catalyst prepared by combining gamma-alumina with chlorosulfonic acid to effect chemical combination of said gamma-alumina with said chlorosulfonic acid.

References Cited

UNITED STATES PATENTS 3,248,444  4/1966  Nixon _____ 260—671

DELBERT E. GANTZ, *Primary Examiner.*

C. R. DAVIS, *Assistant Examiner.*